US006365304B2

(12) United States Patent
Simons

(10) Patent No.: US 6,365,304 B2
(45) Date of Patent: Apr. 2, 2002

(54) METHOD OF MAKING A RANDOM COLOR FILTER ARRAY

(75) Inventor: Michael J. Simons, Middlesex (GB)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/808,844

(22) Filed: Mar. 15, 2001

(30) Foreign Application Priority Data

Mar. 23, 2000 (GB) .......................................... 0006940

(51) Int. Cl.[7] .......................... G02B 5/20; G03C 1/825
(52) U.S. Cl. .......................... 430/7; 430/511; 427/162
(58) Field of Search ..................... 430/7, 511; 427/162

(56) References Cited

U.S. PATENT DOCUMENTS 822,532 A 6/1906 Lumiere et al.
3,728,116 A * 4/1973 Waxman et al. ............ 430/222
4,971,869 A 11/1990 Plummer
5,804,359 A 9/1998 Simons

FOREIGN PATENT DOCUMENTS

EP 0 935 168 8/1999

* cited by examiner

*Primary Examiner*—John A. McPherson
(74) *Attorney, Agent, or Firm*—Frank Pincelli

(57) ABSTRACT

A method of making a random color filter array layer which comprises dispersing in an aqueous medium a water immiscible oily liquid having dyes and/or pigments dissolved or dispersed therein to form colored droplets and mixing the resulting dispersion with one or more other dispersions of different colors in a continuous aqueous phase having a film forming polymer dissolved therein and coating the resulting mixture onto a support layer. The color filter array is useful in image capture devices including digital cameras, scanners and photographic film.

10 Claims, 1 Drawing Sheet

METHOD OF MAKING A RANDOM COLOR FILTER ARRAY

FIELD OF THE INVENTION

The invention relates to color film and in particular to a method of making a random color filter array film.

BACKGROUND OF THE INVENTION

The great majority of color photographs today are taken using chromogenic color film, in which color-forming couplers, which may be incorporated in the film or present in the processing solution, form cyan, magenta and yellow dyes by reaction with oxidized developing agent which is formed where silver halide is developed in an imagewise pattern. Such films require a development process which is carefully controlled in respect of time and temperature, which is usually followed by a silver bleaching and a fixing step, and the whole process typically takes several minutes and needs complex equipment.

Color photography by exposing a black-and-white photographic emulsion through a color filter array which is an integral part of the film or plate on which the photographic emulsion is coated, has long been known to offer certain advantages of simplicity or convenience in color photography. Thus the Autochrome process, disclosed by the Lumiere brothers in 1906 (U.S. Pat. No. 822,532) exposed the emulsion through a randomly disposed layer of red, green and blue-colored potato starch grains, and the emulsion was reversal processed to give a positive image of the scene which appeared colored when viewed by light transmitted through the plate. The process allowed the formation of a colored photograph without the chemical complexity of later photographic methods.

The Dufaycolor process (initially the Dioptichrome plate, L.Dufay, 1909) used a regular array of red, green and blue dyed patches and lines printed on a gelatin layer in conjunction with a reversal-processed black-and-white emulsion system, which similarly gave a colored image of the scene when viewed by transmitted light.

Polavision (Edwin Land and the Polaroid Corporation, 1977) was a color movie system employing a rapid and convenient reversal processing method on a black-and-white emulsion system coated above an array of red, green and blue stripes, which gave a colored projected image. It was marketed as a still color transparency system called Polachrome in 1983.

These methods suffered a number of disadvantages. The images were best viewed by passing light through the processed film or plate, and the image quality was not sufficient to allow high quality prints to be prepared from them, due to the coarse nature of the Autochrome and Dufaycolor filter arrays, and the coarse nature of the positive silver image in the Polavision and Polacolor systems. The regular array patterns were complicated and expensive to manufacture. In addition, the films which used regular or repeating filter arrays were susceptible to color aliasing when used to photograph scenes with geometrically repeating features.

U.S. Pat. No. 4,971,869 discloses a film with a regular repeating filter array which claims to be less susceptible to aliasing problems. The film disclosed comprises a panchromatic photographic emulsion and a repetitive pattern of a unit of adjacent colored cells wherein at least one of the cells is of a subtractive primary color (e.g. yellow, magenta or cyan) or of a pastel color. Scene information can be extracted from the developed film by opto-electronic scanning methods.

European Patent Application 935 168 discloses a light sensitive material comprising a transparent support having thereon a silver halide emulsion layer and a randomly arranged color filter layer comprising colored resin particles. Also disclosed is exposing, processing and elecro-optically scanning the resultant image in such a film and reconstructing the image by digital image processing.

PROBLEM TO BE SOLVED BY THE INVENTION

Color photographic films which comprise a color filter array and a single image recording layer or layer pack have the advantage of rapid and convenient photographic processing, as the single image recording layer or layer pack can be processed rapidly without the problem of mismatching different color records if small variations occur in the process. A small change in extent of development for example will affect all color records equally. Exceptionally rapid processing is possible using simple negative black-and-white development, and if suitable developing agents are included in the coating, the photographic response can be remarkably robust or tolerant towards inadvertent variations in processing time or temperature. Developing agents suitable for including in the coating, and a preferred way of incorporating them, are disclosed in U.S. 5,804,359.

It is desirable that the method of manufacturing the color filter array be of comparatively low cost. Known methods of making regular filter arrays, such as those used for Dufaycolor or Polachrome films, are complex and costly, involving several sequential applications of materials to the film. Known methods of making random filter arrays, such as those used for Autochrome film and that described in EP 935 168 also involve complex operations, including separating and grading or sizing the colored particles of starch or resin respectively, dispersing them in a coating medium, coating and drying and then calendaring the coated layer to flatten the particles.

SUMMARY OF THE INVENTION

It is an object of the invention to provide a method of making a color filter array film which is simpler and of comparatively low cost as compared to methods known in the prior art.

According to the invention there is provided a method of making a random color filter array comprising the steps of:

- dispersing in an aqueous medium a water immiscible oily liquid having dyes and/or pigment particles dissolved and/or dispersed therein to form colored droplets,
- mixing the resulting dispersion with one or more other dispersions of different colors in a continuous aqueous phase having a film forming polymer dissolved therein and coating the resulting mixture onto a support layer.

Preferably any pigment particles dispersed within the water immiscible oily liquid have a mean length of less than 0.5 micrometers.

ADVANTAGEOUS EFFECT OF THE INVENTION

The method of the invention uses existing photographic manufacturing methods such as oil-in-water dispersion and photographic coating. Thus no new equipment is required. Furthermore there is no need to separate or isolate the color elements. Little or no volatile organic solvents need to be evaporated or recovered and the only drying step is the normal drying of a coated photographic film. No calendaring step needed as the fluid filter elements become flatter as the coating dries.

The method of the invention also allows convenient manufacture of films having a preferred film structure in which the CFA is located between the emulsion layers and the top coated surface of the film, that is located further from the support than the emulsion layers. This film structure is preferred because it allows the film to be exposed in the camera with the support towards the back of the camera and the emulsion side toward the lens, which is the orientation for which films and cameras are normally designed. Such a film structure is preferred in the case of Advanced Photographic System films because the magnetic recording layer functions most effectively when coated on the back of the support and has to be in contact with the magnetic heads in the back of the camera. The filter array preparation methods of the prior art would entail complex operations on top of an already-coated emulsion layer, which would need to be done under safelight conditions and would risk harming the very sensitive coated emulsion layers for instance by causing fog or desensitization. Heat calendaring operations, as used in the method described in EP 935 168 could very probably cause heat and pressure fog in the already-coated emulsion layer(s).

In the case of digital image capture devices such as digital cameras and scanners, the method of the invention provides a low cost means of manufacturing color filter arrays, and the random nature of the array will give reduced color fringing at edges and with fine geometric structures in the scene, relative to a regular color array.

Reference is made to related commonly owned co-pending applications entitled Film with Random Color Filter Array, U.S. Ser. No. 09/808,873, and Random Color Filter Array, U.S. Ser. No. 09/810,787, both filed concurrently herewith, the entire contents of which are incorporated herein.

BRIEF DESCRIPTION OF THE DRAWINGS

The method of the invention will now be described, by way of example, with reference to the accompanying drawings, in which.

DETAILED DESCRIPTION OF THE INVENTION

Figure 1:
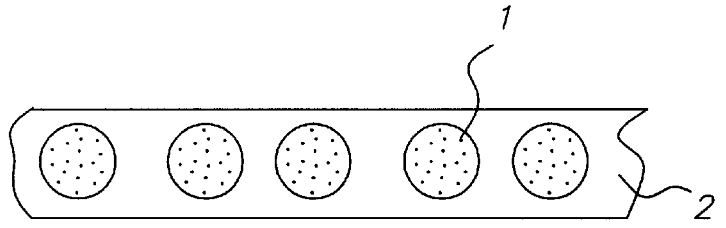
FIG. 1 is a schematic view of a filter layer in a wet, swollen state.
Figure 2:
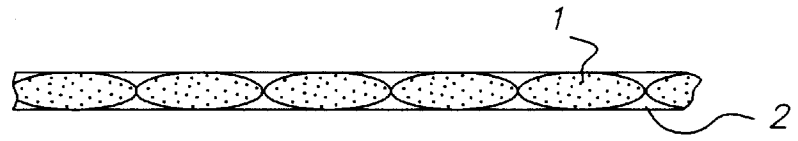
FIG. 2 is a schematic view of a filter layer in a dried state.

FIG. 1 is a schematic view of a wet filter layer in which colored elements 1 are mixed together within a binder 2. FIG. 2 is a schematic view of the filter layer in its dried state, the thickness of the binder 2 being similar to the thickness of the elements 1.

The colored elements 1 of the color filter array may comprise various colored fluid or liquid substances, including droplets of Water-immiscible organic solvents. These may be so-called coupler solvents as used in the photographic industry, in which are incorporated dyes or pigments.

Suitable water-immiscible organic solvents are in general of low volatility, and include for example tricresyl phosphate, di-n-butyl phthalate, diundecyl phthalate, N,N-diethyl lauramide, N,N-di-n-butyl lauramide, triethyl citrate and trihexyl citrate. Other solvents, which may be partially water-soluble, such as ethyl acetate and cyclohexanone, may be used in addition during the preparation of the dispersions, and they may be removed from the final dispersion or coating either by washing or by evaporation.

Suitable dyes may be oil-soluble in nature, and can be chosen for example from the classes of solvent dyes and disperse dyes listed in the Color Index, 3rd Edition, published by The Society of Dyers and Colorists, Bradford, England. Specific examples are listed under their Color Index (CI) names, and include CI Solvent Blue 14, CI Solvent Blue 35, CI Solvent Blue 63, CI Solvent Blue 79, CI Solvent Yellow 174, CI Solvent Orange 1, CI Solvent Red 19, CI Solvent Red 24, CI Disperse Yellow 3, and 4-phenylazodiphenylamine.

Suitable pigments are chosen for their properties of hue, fastness, and dispersibility, and can include CI Pigment Green 7, CI Pigment Green 36, CI Pigment Blue 15:3, CI Pigment Blue 60, CI Pigment Violet 23, CI Pigment Red 122, CI Pigment Red 177, CI Pigment Red 194, CI Pigment Orange 36, CI Pigment Orange 43, CI Pigment Yellow 74, CI Pigment Yellow 93, CI Pigment Yellow 110, and CI Pigment Yellow 139.

When pigment particles are incorporated in the colored elements, they should be of a fine particle size, preferably substantially less than one micrometer. Various substances including polymeric and particulate substances may be incorporated within the colored elements, and these may include dispersing agents such as those used in the pigment and paint industries.

Examples of dispersing agents include the Solsperse™ range of dispersants marketed by Avecia Limited, such as Solsperse 5000, Solsperse 17,000, Solsperse 22,000, and Solsperse 24,000. Further Solsperse dispersing agents are numbered 13650, 13940, and 34750. Another suitable dispersing agent is Carbam 111™, marketed by AAA (Applied Analytics and Automation, M.H.Mathews Additive & Messgerate, Bad Nauheim, Germany).

Polymeric additives to modify the rheology or other properties of the fluid droplets include oil soluble polymers such as polyvinyl butyral, styrene polymers and copolymers, vinyl polymers and copolymers, and acrylate polymers and copolymers.

If the coloring agents are dyes, then these are dissolved in the water-immiscible organic solvent in the quantity required to give the required depth of color in the color elements when coated. Combinations of dyes may be used to give the desired spectral properties.

If the coloring agents are pigments, then the appropriate quantity of pigment or pigments are mixed with the water-immiscible organic solvent, together with dispersing agents if required, and the mixture milled to reduce the pigment particles to a suitable size, which in general should be less than half a micrometer in length or diameter, and preferably less than 0.3 micrometers. Various milling methods and devices known in the art of pigment preparation may be used, and these include ball mills, media mills and sand mills.

The resulting colored water-immiscible organic solvent or oil is then dispersed in an aqueous medium so as to form colored droplets of the desired size. Dispersing methods known in the photographic art may be used. These include rotor-stator devices, homogenisers and emulsifiers which force the liquid at high shear through orifices or channels, and ultrasonic devices such as horns and probes. The oil/water interface may be stabilized by addition to the aqueous phase of surfactants, polymers including natural polymers such as gelatin, and particulate species such as colloidal silica. Surface stabilization by particulate species such as colloidal silica is particularly preferred as it can give a narrow size distribution of the resultant colored droplets and the size of the droplets may be controlled by the concentration of the particulate species employed.

To form the color filter array, dispersions of colored water-immiscible organic solvent or oil of two or more color classes are mixed together in the presence of a water-soluble film former or binder such as gelatin. The water-soluble film former or binder may be colorless, or colored by means of dyes or pigments which are incorporated in the aqueous phase. If dyes are used, they must be bound within the aqueous layer for instance by incorporating a mordant which binds the dye or dyes within the layer, or by using reactive dyes which chemically react with a polymeric species within the layer. If pigment particles are used, they must be milled to a sufficiently fine particle size, for example less than 0.5 micrometers, and it may be necessary to incorporate dispersing agents to prevent aggregation or clumping of the dispersed particles. Pigments used to color the water-permeable polymeric binder can include those listed above. Dyes used to color the water-permeable polymeric binder are water-soluble dyes, and may be anionic dyes such as acid dyes, direct dyes and mordant dyes, for example CI Acid Yellows 40, 42, 65 and 99; CI Acid Orange 63; CI Acid Red 92; CI Acid Violets 7, 9 and 17; CI Acid Blues 7, 92, and 249; CI Direct Yellow 50; CI Direct Red 75; and CI Mordant Red 3. Anionic dyes may be bound in the layer by means of a cationic polymeric mordant, or by interaction with large cationic molecules or with metal salts. Alternatively, cationic dyes may be used, and bound in the layer by means of an anionic polymeric mordant, or by interaction with large anionic molecules including surfactant molecules. Examples of cationic dyes which may be used include CI Basic Yellow 11, CI Basic Red 9, CI Basic Blues 3 and 66, and CI Mordant Blue 14.

Various combinations of colors may be used, for instance red, green and blue droplets coated in a colorless gelatin binder, or red and blue droplets coated in a green-colored gelatin binder. The colored droplets may contain more than one coloring agent, for instance a blue droplet may contain a mixture of magenta and cyan pigments or dyes. Cyan, magenta and yellow droplets may be used, or other combinations such as cyan, magenta and green droplets in a yellow-colored binder.

The combined mixture of dispersed colored droplets and the solution of optionally colored water-soluble binder is then coated on the film. It may be coated simultaneously with other layers, and/or on top of already-coated layers such as emulsion layers. Alternatively, it may be dried and further layers then coated on top of the coated color filter array. The coated laydown of colored droplets should be adjusted to give the desired closeness of packing in the dried layer without excessive overlapping of droplets. In the case that the water-soluble binder is colored, it is desirable to adjust the coated laydown of water-soluble binder so that the dried thickness of the colored binder is similar to the thickness of the dried-down droplets themselves, as depicted schematically in FIG. 2.

Normally, a hardening agent will be added to one or more layers of the film so that the binder(s) in the film, including the water-soluble binder in the filter layer, becomes hardened or cross-linked to make the array physically robust, and, in the case of a photographic film, so that the film can swell but not dissolve in the developer and other processing solutions.

Figure 3:
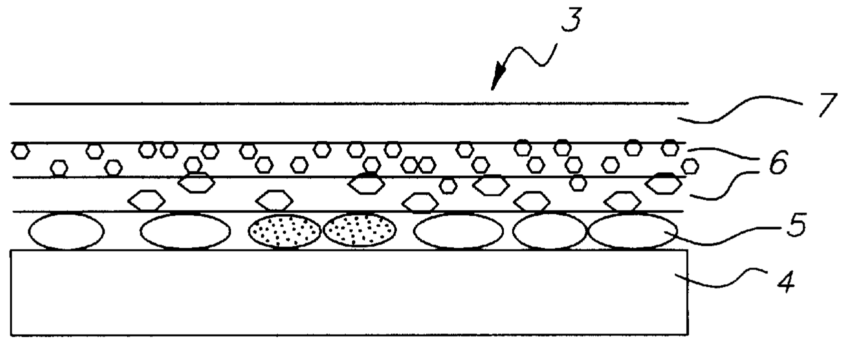
FIG. 3 is a schematic view of an embodiment of a film having a color filter array prepared according to the invention.

FIG. 3 shows one embodiment of a film having a color filter array prepared according to the invention. The film 3 comprises a support 4, a color filter array, emulsion layers 6 and a supercoat 7. In this embodiment the film 3 is coated with a color filter array nearest to the support 4. Optionally, an underlayer (not shown) may be coated between the support 4 and the color filter array 5. Chemicals which are useful during chemical processing may be coated in the underlayer. An emulsion layer unit 6 is provided above the color filter array 5. The top layer of the film is provided by a supercoat 7 with antihalation means.

The emulsion layer unit 6 may comprise one or more layers. The unit is sensitive to light which has passed through each or all of the different color elements of the array . Thus the image information for each color record is recorded in the emulsion layer unit. The emulsions may be of different speeds. Photographic addenda known in the art, such as antifoggants and speed-increasing agents may be present in or adjacent to the emulsion layers. Substances such as developing agents, blocked developing agents, color couplers and other materials which take part in the processing step may be in or adjacent to the emulsion layer unit 6. Developing agents suitable for including in the coating, and a preferred way of incorporating them, are disclosed in U.S. Pat. No. 5,804,359.

Figure 4:
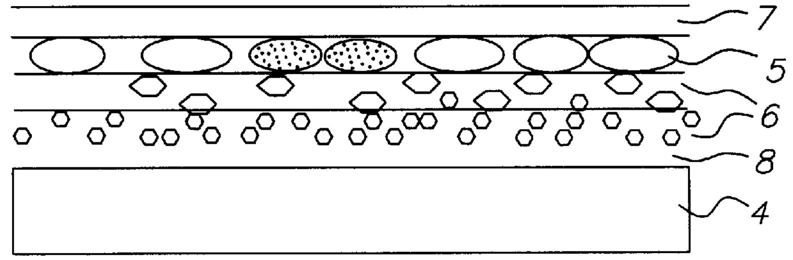
FIG. 4 is a schematic view of a second embodiment of a film having a color filter array prepared according to the invention.

FIG. 4 shows a second embodiment of the film prepared in accordance with the invention. In this film 3 the color filter array is further from the support 4 than the emulsion layer unit 6. An antihalation layer 8 is provided between the support 4 and the emulsion layer unit 6. Chemicals which are useful during chemical processing may also be coated in this antihalation layer.

It is possible in both embodiments for the light-sensitive emulsion layer 6 to be a heat-developable layer, so that the development and processing of the film is achieved by overall heating of the exposed film.

The random color filter array prepared according to the invention comprises colored elements or patches whose individual linear dimensions (diameter in the case of a circular element) in the plane of the film may be between 1 and 50 micrometers. In a preferred embodiment of the invention the elements will be between 3 and 10 micrometers in diameter. Three or more color channels are generally required. These can be provided by, for example, two color classes of color element spaced irregularly in the plane of the film with the spaces between them, viewed from a direction normal to the film plane, either colorless (clear or white), or of a third color. Alternatively, three or more color classes of discrete color elements may be provided, and the spaces between them may be colorless (clear or white), or dark or black, or colored.

When a film prepared according to the invention is used, it is necessary for the emulsion layers 6 to be exposed by light which has passed through the color filter array . Thus with the film structure depicted in FIG. 3, the support 4 will be closer to the camera lens during exposure than the coated layers. With the film structure depicted in FIG. 4, the coated layers will be closer to the camera lens during exposure than the film support 4.

After exposure, the emulsion layers may be developed and fixed by known methods of photographic processing so as to give an image which modulates light passing through each of the spectrally distinguishable types of filter element. Conventional black-and-white development, using developing agents contained in the solution and/or coated in the film, followed by fixing and washing, is a suitable form of photographic processing.

Conventional scanning techniques can be employed, including point-by-point, line-by-line and area scanning, and require no detailed description. A simple technique for scanning is to scan the photographically processed element point-by-point along a series of laterally offset parallel scan paths. The intensity of light received from or passing through the photographic element at a scanning point is noted by a sensor which converts radiation received into an electrical signal. The electrical signal is processed and sent to memory in a digital computer together with locant information required for pixel location within the image.

A convenient form of scanner can consist of a single multicolor image sensor or a single set of color sensors, with a light source placed on the opposite side of the film. Light transmitted through the film can give information on the image pattern in the emulsion layer(s) modulated by the color filter array. Various methods of image processing may be employed. A relatively simple method is to represent the image data in a color model which has a luminance or lightness component and two chromatic or color components, such as the CIE L*a*b model. The chromatic components are then blurred with a suitable image filter to remove the higher frequency color information which arises largely from the color filter array, and the blurred chromatic information recombined with the original luminance information. The color saturation of the image may be varied by altering the contrast of the chromatic components.

Other methods of image processing may be employed.

Another method of image processing is disclosed in co-pending UK application no GB 0002481.0, entitled Method of Image Processing, which is here incorporated by reference.

After image processing the resulting representation of the scene recorded by the method of the invention may be viewed on a screen or printed by suitable means to give a printed photographic image.

EXAMPLE

Preparation of a Random Color Filter Array

The array comprised droplets of a non-volatile oily liquid colored with dyes and pigment particles, dispersed in an aqueous phase using colloidal silica as a surface-stabilizing and size-controlling substance, and then coated with gelatin as a binder and dried.

Two silica dispersions were prepared:

Silica Dispersion A:

To 320 g of water was added 12 g of Ludox (trade mark) SM30 colloidal silica suspension and 1.2 g of a 10% w/v aqueous solution of a copolymer of methylaminoethanol and adipic acid. The mixture was stirred and its pH adjusted from its initial value of 4.86 to 4.00 by addition of 4M sulphuric acid.

Silica Dispersion B:

To 312 g of water was added g of Ludox AM30 colloidal silica suspension and 1.0 g of a 10% w/v aqueous solution of a copolymer of methylaminoethanol and adipic acid. The mixture was stirred and its pH adjusted from its initial value of 4.48 to 4.00 by addition of 4M sulphuric acid.

Dispersions of Colored Oil Droplets were Prepared:

Red Dispersion:

The following were mixed together to form a colored oil phase:

| | |
|---|---|
| Sudan M Red 462 Liquid Dye (supplied by BASF) | 3.5 g |
| Sudan Yellow 172 Liquid Dye (supplied by BASF) | 2.7 |
| Tricresyl phosphate | 8.0 |
| di-n-butyl lauramide | 8.0 |

To this was added the following aqueous phase:

| | |
|---|---|
| Silica dispersion A | 24 g |
| Silica dispersion B | 12 g |
| Water | 64 |

and the combined mixture was agitated for minutes with a "Soniprobe" ultrasonic probe (supplied by Lucas Dawe Ultrasonics) to form an oil-in-water dispersion. The probe used had a tip diameter of half an inch (1.3cm), and the power setting employed was or 50%.

The dispersion was then added to 120 g of 12.5% w/v aqueous gelatin solution containing 0. 17% w/v Alkanol XC surfactant.

Blue Oil Phase:

The following mixture was ball-milled for 3 days using 1 mm diameter zirconia beads as the grinding media:

| | |
|---|---|
| CI Pigment Violet 23 | 6.0 g |
| CI Solvent Blue 14 | 3.2 |
| CI Solvent Blue 35 | 1.6 |
| Tricresyl phosphate | 30 |
| di-n-butyl lauramide | 30 |

Blue Dispersion:

To 20 g of the blue oil phase was added the following aqueous phase:

| | |
|---|---|
| Silica dispersion A | 22.5 g |
| Silica dispersion B | 10.0 |
| Water | 92.5 |

and the combined mixture was agitated for minutes with a "Soniprobe" ultrasonic probe (supplied by Lucas Dawe Ultrasonics) to form an oil-in-water dispersion. The probe used had a tip diameter of half an inch (1.3 cm) and the power setting employed was or 50%.

The dispersion was then added to 150 g of 12.5% w/v aqueous gelatin solution containing 0. 17% w/v Alkanol XC surfactant.

Green Oil Phase:

The following mixture was ball-milled for 3 days using 1 mm diameter zirconia beads as the grinding media:

| | |
|---|---|
| CI Pigment Green 7 | 9.0 g |
| CI Pigment Yellow 92 | 6.0 |
| tricresyl phosphate | 30.0 |
| di-n-butyl lauramide | 30.0 |
| ethanol | 30.0 |

Green Dispersion:

To 28 g of the green oil phase was added the following aqueous phase:

| | |
|---|---|
| Silica dispersion A | 30.0 g |
| Silica dispersion B | 15.0 |
| Water | 72.5 |

and the combined mixture was agitated for minutes with a "Soniprobe" ultrasonic probe (supplied by Lucas Dawe Ultrasonics) to form an oil-in-water dispersion. The probe used had a tip diameter of half an inch (1.3 cm) and the power setting employed was or 50%.

The dispersion was then added to 150 g of 12.5% w/v aqueous gelatin solution containing 0.17% w/v Alkanol XC surfactant.

Coating of Color Filter Array:

Portions of the above dispersions were mixed together:

| | |
|---|---|
| Red dispersion | 82 g |
| Green dispersion | 123 |
| Blue dispersion | 95 |
| Water | 48 |

and the resulting mixture was coated on photographic film base at a wet coverage of 35 ml per square meter. At the same time, aqueous gelatin layers were coated above and below the filter array layer, to give the following coated laydowns:

Layer 1:gelatin, 1.0 g/m2

Layer 2:gelatin, 2.2 g/m2, red oil phase, 0.70 g/m2, green oil phase, 0.75 g/m2,blue oil phase, 0.60 g/m2

Layer 3:gelatin, 0.72 g/m2.

On examining the coated layer under a microscope, it was seen that it had dried to give an array of closely packed red, green and blue color elements, approximately circular in shape and having diameters between and micrometers. They were in a single layer, with little overlap between adjacent elements, and about 12% of the total area comprised colorless areas between the colored elements.

Coating of Light Sensitive Layers:

A length of the coated color filter array was then coated with photographic emulsion layers so that the emulsion layers were immediately above the layers of the array.

Emulsion Layer A:

Fast silver bromoiodide panchromatically sensitized emulsion (tabular grain, average diameter approx. 1.7 $\mu$m, thickness 0.13 $\mu$m, 4.5 mol % iodide), coated at 0.7 g/m2, together with gelatin, 1.3 g/m2. 4-hydroxy-6-methyl-1,3,3A, 7-tetraazindene, sodium salt, was also present at 1.5 g per mole of silver.

Emulsion Layer B:

Mid speed silver bromoiodide panchromatically sensitized emulsion (tabular grain, average diameter approx. 1.1 $\mu$m, thickness 0. 12 $\mu$m, 4.5 mol % iodide), coated at 1.5 g/m2, slow silver bromoiodide panchromatically sensitized emulsion (tabular grain, average diameter approx. 0.7 $\mu$m, thickness 0.11 $\mu$m, 3 mol % iodide), coated at 1.0 g/m2 together with gelatin, 2.0 g/m2. 4-hydroxy-6-methyl-1,3,3A, 7-tetraazindene, sodium salt, was also present at 1.5 g per mole of silver.

Supercoat:

Gelatin, 1.6 g/m2,hardener bis(vinylsulphonyl)methane, 0.072 g/m2, and an antihalation dye whose color was dischargeable in the developer solution, coated as a particulate dispersion, 0.1 g/m2.

Surfactants used to aid the coating operation are not listed in this example.

Recording A Scene with the Film:

A length of the film was slit to 35 mm width, the edges were perforated, the film was put in a standard 35 mm cassette, and the cassette loaded into a single lens reflex camera. The film was oriented so that light from the camera lens passed first through the film base, then through the coated color filter array, and then onto the emulsion layers.

The camera was adjusted to give an exposure at a speed setting of 200 ISO, and a photograph taken of an outdoor scene.

The exposed film was developed for 2 minutes at 25C in the following developer solution:

| | |
|---|---|
| sodium carbonate (anh.) | 9 g/l |
| ascorbic acid | 7.5 |
| sodium sulphite (anh.) | 2.5 |
| sodium bromide | 0.5 |
| 4-hydroxymethyl-4-methyl-1-phenyl-3-pyrazolidone | 0.35 |

pH adjusted to 10.0 with dilute sodium hydroxide solution.

It was treated for 15 s with a stop bath (1% acetic acid aqueous solution) and fixed for 1 minute in Kodak "3000" Fixer Solution diluted 1+3 with water, then washed for 3 minutes and dried. A colored negative image of the scene was visible.

The image was then scanned with a Kodak RFS 2035 scanner and the resulting image file imported into Adobe Photoshop™ image manipulation software. The "Autolevels" command was used to correct overall brightness, contrast and color balance, then the image was converted to L*a*b* color space. The a and b channels were treated with a blurring filter (Gaussian blur, 12 pixels radius) then their contrast increased using a numerical value of 75, which resulted in a strong increase in color saturation. The image was converted back to R,G,B space and color saturation and color balance adjusted to give a pleasing colored image of the original scene.

As stated earlier the invention uses existing photographic manufacturing methods such as oil-in-water dispersion and photographic coating which means that no new equipment is required. The invention results in a simplified and economical process when compared with the known prior art.

The invention has been described with particular reference to one example. It will be understood by those skilled in the art that variations and modifications may be effected within the spirit and scope of the invention as defined in the appended claims.

PARTS LIST 1. colored elements
2. binder
3. film
4. support
5. color filter array
6. emulsion layer
7. supercoat
8. antihalation layer

What is claimed is:

1. A method of making a random color filter array comprising the steps of:

dispersing in an aqueous medium a water immiscible oily liquid having dyes and/or pigment particles dissolved and/or dispersed therein to form colored droplets, the aqueous medium having dispersed therein a quantity of colloidal silica sufficient to stabilize the surface area of the droplets so as to control the average diameter thereof, mixing the resulting dispersion with one or more other dispersions of different colors in a continuous aqueous phase having a film forming polymer dissolved therein and coating the resulting mixture onto a support layer.

2. A method as claimed in claim 1 wherein the colored droplets are formed having diameters in the range of 1 to 20 micrometers.

3. A method as claimed in claim 1 wherein the film forming polymer is gelatin.

4. A method as claimed in claim 1 wherein the water immiscible oily liquid having dyes and/or pigment particles dissolved and/or dispersed therein also has polymeric substances dissolved therein.

5. A method as claimed in claim 1 wherein the water immiscible oily liquid having dyes and/or pigment particles dissolved and/or dispersed therein also has dispersing agents dispersed therein.

6. A method as claimed in claim 1 wherein the pigment particles dispersed within the water immiscible oily liquid have a mean length of less than 0.5 micrometers.

7. A method as claimed in claim 1 wherein the color filter array is part of a color photographic film.

8. A method as claimed in claim 7 wherein the support layer is coated with light sensitive emulsion layers.

9. A method as claimed in claim 8 wherein the color filter array layer is coated further from the support layer than the light sensitive emulsion layer.

10. A method as claimed in claim 8 wherein the color filter array layer is coated closer to the support layer than the light sensitive emulsion layer.

* * * * *